United States Patent
Kottilingam et al.

(10) Patent No.: US 9,909,432 B2
(45) Date of Patent: Mar. 6, 2018

(54) GAS TURBINE TRANSITION PIECE AFT FRAME ASSEMBLIES WITH COOLING CHANNELS AND METHODS FOR MANUFACTURING THE SAME

(71) Applicant: General Electric Company, Schenectady, NY (US)

(72) Inventors: Srikanth Chandrudu Kottilingam, Simpsonville, SC (US); Benjamin Paul Lacy, Greer, SC (US); Brian Lee Tollison, Honea Path, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 897 days.

(21) Appl. No.: 14/090,832

(22) Filed: Nov. 26, 2013

(65) Prior Publication Data

US 2015/0369068 A1 Dec. 24, 2015

(51) Int. Cl.
*F01D 25/14* (2006.01)
*F01D 9/02* (2006.01)
*B22F 7/08* (2006.01)
*F01D 25/12* (2006.01)
*F23R 3/60* (2006.01)
(Continued)

(52) U.S. Cl.
CPC ............. *F01D 9/023* (2013.01); *B22F 5/10* (2013.01); *B22F 7/08* (2013.01); *C22C 1/0433* (2013.01); *C22C 19/056* (2013.01); *C22C 19/057* (2013.01); *F01D 25/12* (2013.01); *F23R 3/60* (2013.01); *F05D 2220/32* (2013.01); *F05D 2230/22* (2013.01); *F05D 2230/60* (2013.01); *F05D 2230/90* (2013.01);
(Continued)

(58) Field of Classification Search
CPC . F01D 9/023; F01D 25/12; F01D 9/06; F23R 3/60
See application file for complete search history.

(56) References Cited

U.S. PATENT DOCUMENTS 6,412,268 B1 * 7/2002 Cromer .................. F01D 9/023
60/760
6,450,762 B1 9/2002 Munshi
(Continued)

OTHER PUBLICATIONS

European Search Report and Opinion issued in connection with corresponding EP Application No. 14194627.7 dated Apr. 7, 2015.

*Primary Examiner* — Logan Kraft
*Assistant Examiner* — Jason Fountain
(74) *Attorney, Agent, or Firm* — Ernest G. Cusick; Frank A. Landgraff (57) ABSTRACT

Aft frame assemblies for a gas turbine transition pieces include a body comprising an exterior surface and a plurality of interior surfaces, one or more exterior cooling holes disposed on the exterior surface of the body for capturing compressor discharge air outside of the transition piece, and a supplemental component bonded to at least one of the plurality of interior surfaces of the body. At least one cooling channel is at least partially defined by the supplemental component and the interior surface that the supplemental component is bonded to, wherein the at least one cooling channel fluidly connects at least one of the one or more exterior cooling holes to one or more interior cooling outlets that discharge the compressor discharge air captured from the at least one of the one or more exterior cooling holes.

20 Claims, 7 Drawing Sheets

(51) Int. Cl.
*B22F 5/10* (2006.01)
*C22C 1/04* (2006.01)
*C22C 19/05* (2006.01)

(52) U.S. Cl.
CPC .................. *F05D 2260/201* (2013.01); *F23R 2900/00018* (2013.01); *Y02T 50/671* (2013.01); *Y02T 50/676* (2013.01)

(56) References Cited

U.S. PATENT DOCUMENTS

| | | |
|---|---|---|
| 6,494,044 B1 | 12/2002 | Bland |
| 6,546,627 B1 | 4/2003 | Sekihara et al. |
| 6,655,146 B2 | 12/2003 | Kutter et al. |
| 6,675,584 B1 | 1/2004 | Hollis et al. |
| 6,751,962 B1 | 6/2004 | Kuwabara et al. |
| 6,792,763 B2 | 9/2004 | Sileo et al. |
| 7,200,986 B2 | 4/2007 | Sanders |
| 7,845,549 B2 * | 12/2010 | Budinger ............ B23K 1/0018 228/245 |
| 8,186,167 B2 | 5/2012 | Chila et al. |
| 8,245,515 B2 * | 8/2012 | Davis, Jr. ................ F01D 9/023 415/144 |
| 8,322,146 B2 | 12/2012 | Rizkalla et al. |
| 8,438,856 B2 | 5/2013 | Chila et al. |
| 9,255,484 B2 * | 2/2016 | Cihlar .................... F01D 9/023 |
| 2010/0034643 A1 | 2/2010 | Davis, Jr. et al. |
| 2011/0162378 A1 | 7/2011 | Chila et al. |
| 2012/0156020 A1 | 6/2012 | Kottilingam et al. |
| 2012/0308843 A1 * | 12/2012 | Ott ...................... B23K 1/0018 428/614 |
| 2013/0209250 A1 | 8/2013 | Simmons et al. |

* cited by examiner

GAS TURBINE TRANSITION PIECE AFT FRAME ASSEMBLIES WITH COOLING CHANNELS AND METHODS FOR MANUFACTURING THE SAME

BACKGROUND OF THE INVENTION

The subject matter disclosed herein relates to gas turbine transition pieces and, more specifically, to aft frame assemblies with cooling channels for gas turbine transition pieces.

Turbine components, such as buckets (blades), nozzles (vanes), transition pieces, and other hot gas path components of industrial and aircraft gas turbine engines, may be formed of nickel, cobalt or iron-base superalloys with suitable mechanical and environmental properties for turbine operating temperatures and conditions. Because the efficiency of a turbomachine is partially dependent on its operating temperatures, there may be a demand for components such as turbine buckets, nozzles and transition pieces to be capable of withstanding increasingly higher temperatures. As the maximum local temperature of a superalloy component approaches the melting temperature of the superalloy, forced air cooling may be utilized to partially cool the component. For this reason, compressor discharge air may be forced through internal cooling holes within aft frame assemblies for transition pieces then discharged internally therein to transfer heat from the component. Cooling holes can also be configured so that cooling air serves to film cool the surrounding surface of the component.

However, the machining of cooling holes in relatively small spaces (such as aft frame assemblies) may be limited. Furthermore, cooling holes may require additional compressor discharge air to cool the component due to the limited distribution of a straight-passage cooling hole arrangement.

Accordingly, alternative aft frame assemblies with cooling channels would be welcome in the art.

BRIEF DESCRIPTION OF THE INVENTION

In one embodiment, an aft frame assembly for a gas turbine transition piece is disclosed. The aft frame assembly includes a body comprising an exterior surface and a plurality of interior surfaces, one or more exterior cooling holes disposed on the exterior surface of the body for capturing compressor discharge air outside of the transition piece, and a supplemental component bonded to at least one of the plurality of interior surfaces of the body. At least one cooling channel is at least partially defined by the supplemental component and the interior surface that the supplemental component is bonded to, wherein the at least one cooling channel fluidly connects at least one of the one or more exterior cooling holes to one or more interior cooling outlets that discharge the compressor discharge air captured from the at least one of the one or more exterior cooling holes.

In another embodiment, a method for manufacturing at least one cooling channel in an aft frame assembly for a gas turbine transition piece is disclosed. The method includes disposing a supplemental component against at least one of a plurality of an interior surfaces of a body of the transition piece, wherein the at least one cooling channel is at least partially defined by the supplemental component and the interior surface that the supplemental component is bonded to. The method further includes bonding the supplemental component to the transition piece, wherein the at least one cooling channel fluidly connects one or more exterior cooling holes on an exterior surface of the body to one or more interior cooling outlets.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
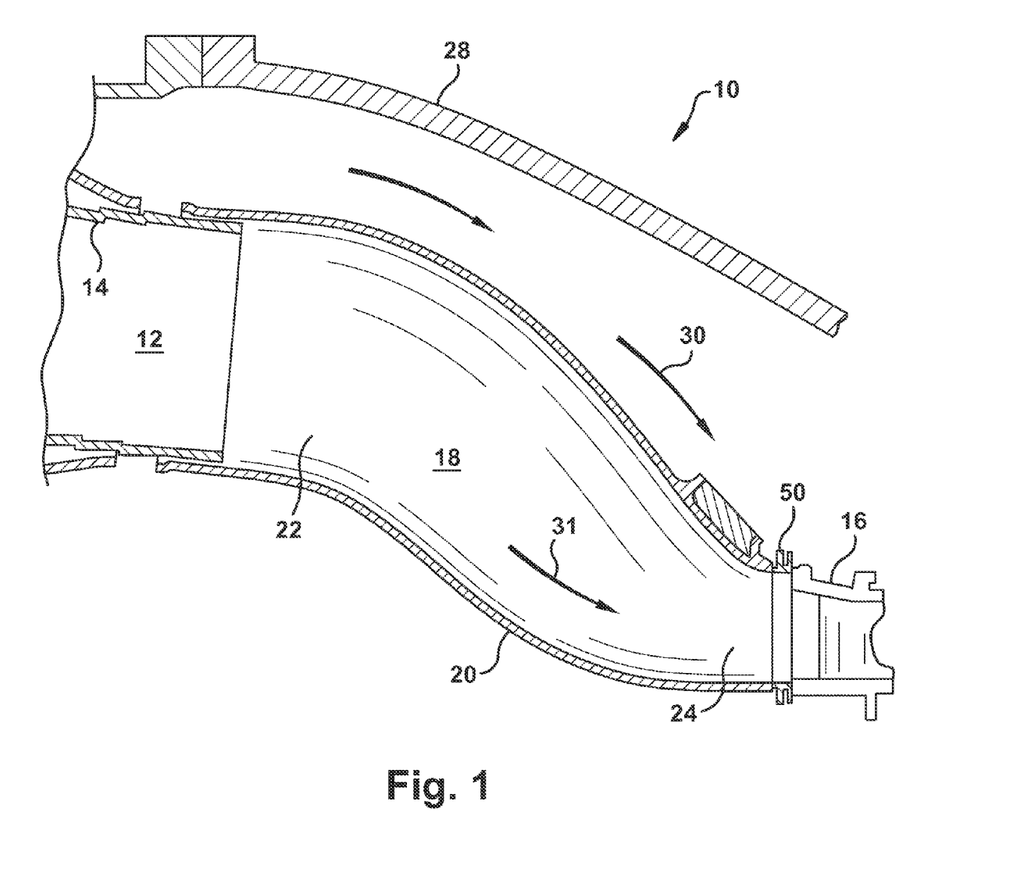
FIG. 1 is a cross-sectional view of a combustion system according to one or more embodiments shown or described herein.

Referring now to FIG. 1, a cross-sectional view of a combustion system 10 is illustrated. Components of the combustion system 10 include a transition piece 18 for enclosing and confining combustion products for flow from a combustor 12 of a gas turbine to a first stage nozzle 16. It should be appreciated that there is an annular array of combustors 12 for generating and flowing hot gases to an annular array of nozzles 16, one of each of such combustors 12, nozzles 16 and transition pieces 18 being illustrated. Also illustrated is a portion of the compressor discharge casing 28. During operation, compressor discharge air 30 may be provided within the space between the casing 28 and the combustor liner 14 and transition piece 18 to cool components of the combustion system 10 and as a source of dilution air.

The transition piece 18 can include an enclosure 20 for confining and directing the flow of combustion products 31 from the combustor 12 to the nozzle 16. Thus, the enclosure 20 includes a forward end 22 and an aft end 24 for respectively receiving the combustion products and facilitating the flow of combustion products 31 in the direction of the nozzle 16. The forward end 22 of the transition piece 18 may be generally circular. In one embodiment, the transition piece 18 may transition from a circular forward end 22 generally axially and radially inwardly relative to the turbine axis and terminates in a slightly arcuate, generally rectilinear aft end 24. Located between the aft end 24 and the nozzle 16 may be an aft frame assembly 50. The aft frame 50 may be generally rectilinear in shape to match the shape of the aft end 24 of the transition piece 18 and may be attached to the transition piece 18 by bonding (e.g., braze, weld, etc.) the aft-frame 26 to the aft end 24 via any suitable connection technique.

Referring now to FIGS. 1-9, an embodiment of an aft frame assembly 50 for a transition piece 18 is illustrated in accordance with one aspect of the present subject matter. The aft frame assembly 50 can generally include a body 51 that is generally rectilinear in shape. It should be readily appreciated, however, that the body 51 can have any desired shape and need not have the particular shape illustrated in FIG. 2. For instance, the aft frame assembly 50 may be circular, be in the shape of an oval or be in the shape of any suitable polygon. The shape of the aft frame assembly 50 will depend in large part on the particular shape and configuration of the transition piece 18.

Figure 2:
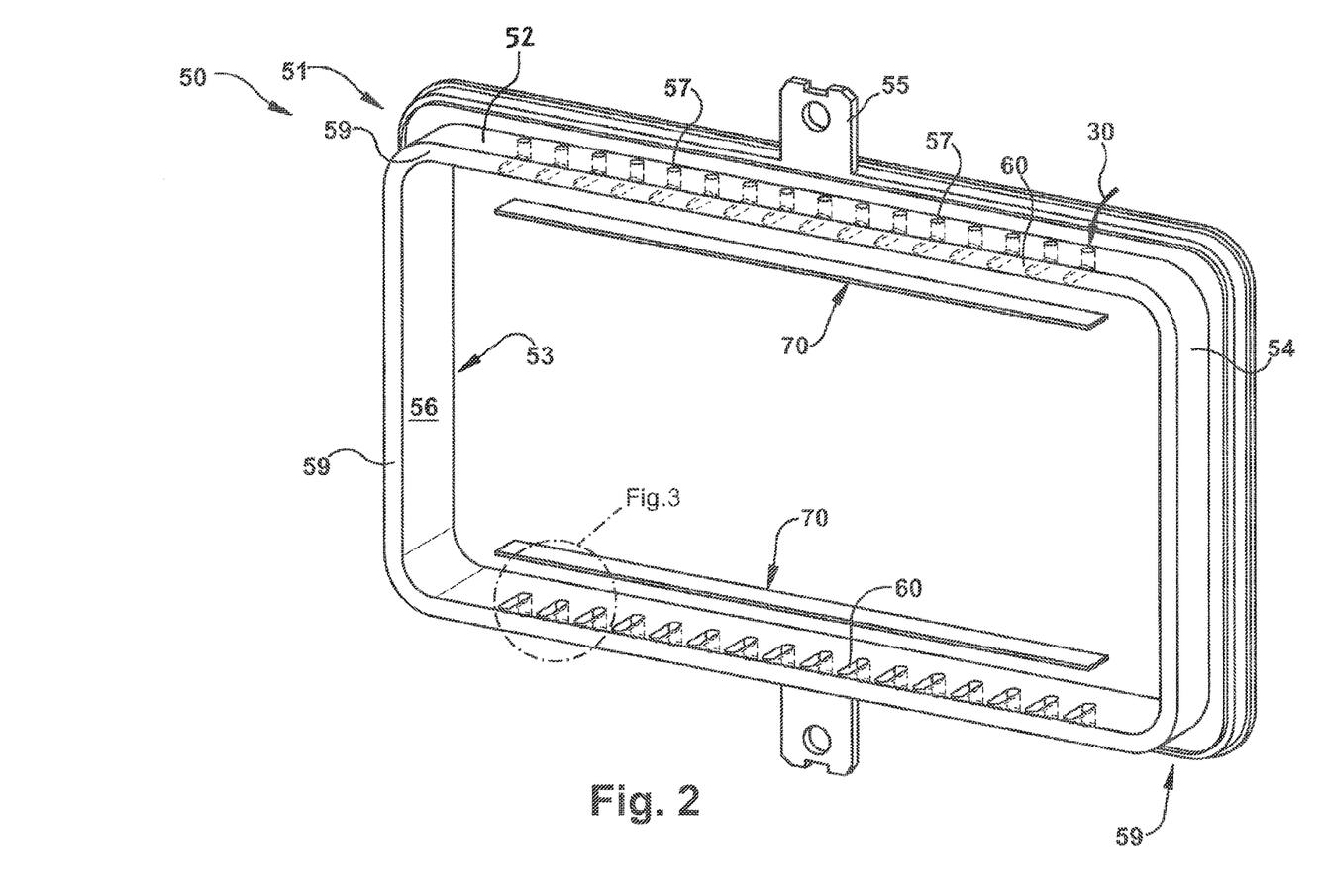
FIG. 2 is an exploded perspective view of an aft frame assembly for a transition piece according to one or more embodiments shown or described herein.
Figure 3:
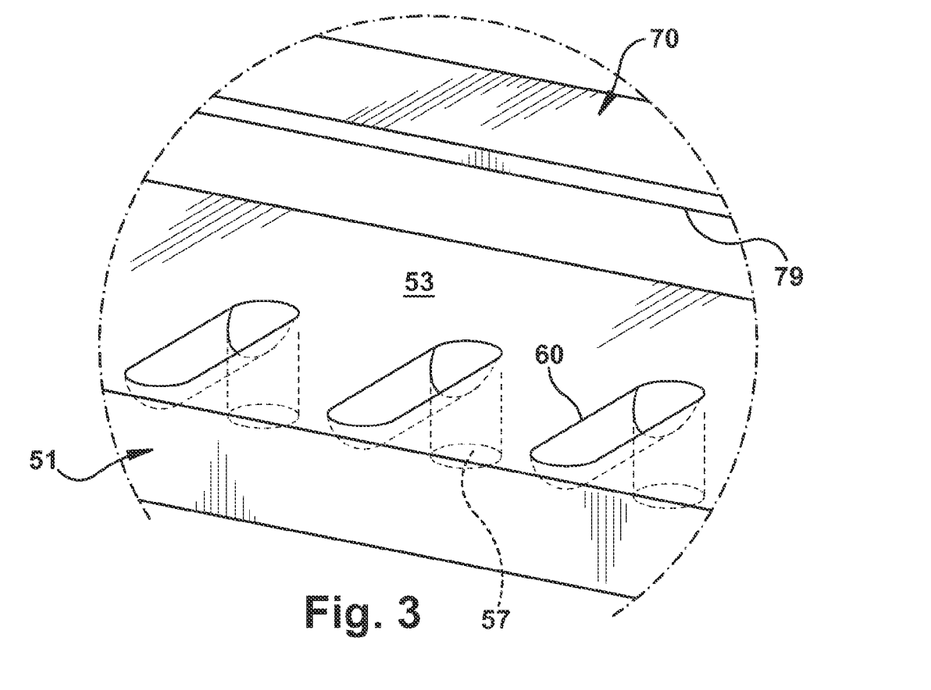
FIG. 3 is a an exploded view of a portion of the aft frame assembly of FIG. 2 according to one or more embodiments shown or described herein.
Figure 4:
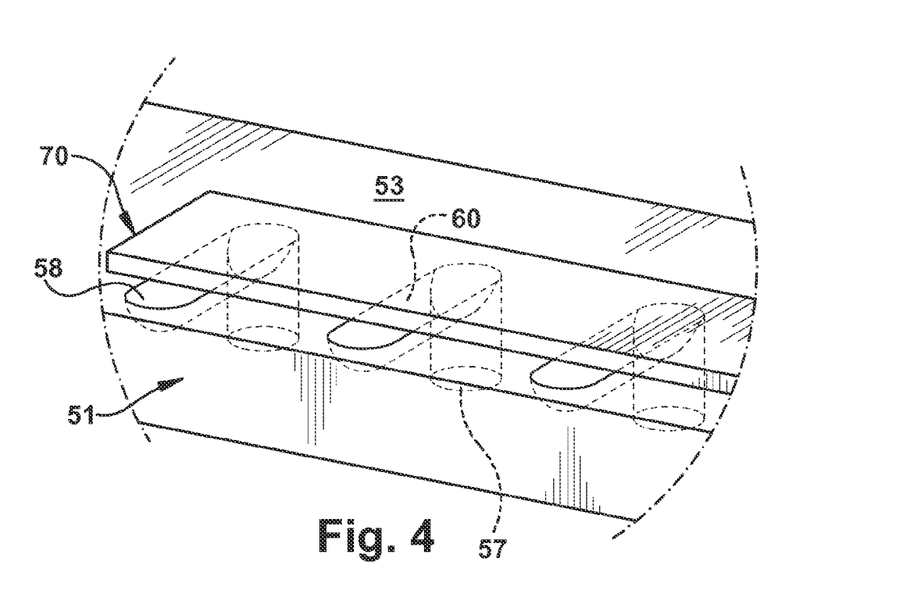
FIG. 4 is an assembled perspective view of the portion of the aft frame assembly of FIG. 3 according to one or more embodiments shown or described herein.

The body 51 includes an exterior surface 52 (that faces the compressor discharge air 30) and a plurality of interior surfaces 53 (i.e., surfaces that are not the exterior surface 52). Specifically, the body 51 comprises interior surfaces 53 that include an inner hot face surface 56 (i.e., the surface that faces the interior of the transition piece 18 facilitating the flow of combustion products 31) and a downstream facing seal surface 59 (i.e., the surface that faces the downstream nozzles and buckets of the turbine). The body 51 may also include at least one mounting hook 55 extending generally outward from the body 51. The mounting hook 55 may be configured to secure the aft-frame 50 to any combustion product receiving apparatus or device.

The body 51 may also include a laterally extending flange 54. The flange 54 can be configured such that the aft frame assembly 50 may be attached to a transition piece 18 of a combustion system. The aft frame assembly 50, for example, may be welded to the transition piece 18. In such an embodiment, an outer lip of the flange 54 may be configured such that flange 54 can be welded to the aft end 24 of the transition piece 18. Additionally, the flange 54 may generally have any length and thickness. In one embodiment, the maximum flange length is 5.1 cm and the flange thickness ranges from 0.3 cm to 0.65 cm, such as from 0.4 to 0.6 and all other sub-ranges there between.

As best illustrated in FIGS. 2-7, the aft frame assembly 50 can comprise one or more exterior cooling holes 57 and one or more interior cooling outlets 58. The one or more exterior cooling holes 57 are disposed on the exterior surface 52 of the body 51 for capturing compressor discharge air 30 outside of the transition piece 18. For example, the one or more exterior cooling holes 57 may extend at an angle from the exterior surface 52 in towards the body 51. The one or more exterior cooling holes 57 may be positioned at any relative location about the aft frame assembly 50 and have any suitable configuration/orientation that enable the capturing of compressor discharge air 30 for subsequent distribution as should be appreciated herein.

Likewise, the one or more interior cooling outlets 58 are disposed on one or more of the interior surfaces 53 (such as on the inner hot face surface 56 of the body 51 and/or the downstream facing seal surface 59 of the body 51) for discharging the compressor discharge air 30 that was captured from at least one of the one or more exterior cooling holes 57. By being positioned on the inner hot face surface 56, the one or more interior cooling outlets 58 discharge compressor discharge air 30 to the interior of the aft frame assembly 50 which can assist in controlling the temperature of the hot gas path components. For example, cooling outlets 58 may be disposed on the inner hot face surface 56 to help cool the interior of the transition piece 18. Likewise, cooling outlets 58 may be disposed on the downstream facing seal surface 59 to direct cooling air towards first stage nozzles or buckets.

The one or more interior cooling outlets 58 may be positioned at any relative location within the aft frame assembly 50 and have any suitable configuration/orientation (e.g., holes, trenches or the like) that enable the discharging of captured compressor discharge air 30. For example, in some embodiments, the aft frame assembly 50 may comprise more interior cooling outlets 58 than exterior cooling holes 57 due to sufficient distribution of captured compressor discharge air 30 as should be appreciated herein. Such embodiments may enable sufficient component cooling with less compressor discharge air 30 to promote better operating efficiency of the combustion system 10.

Figure 5:
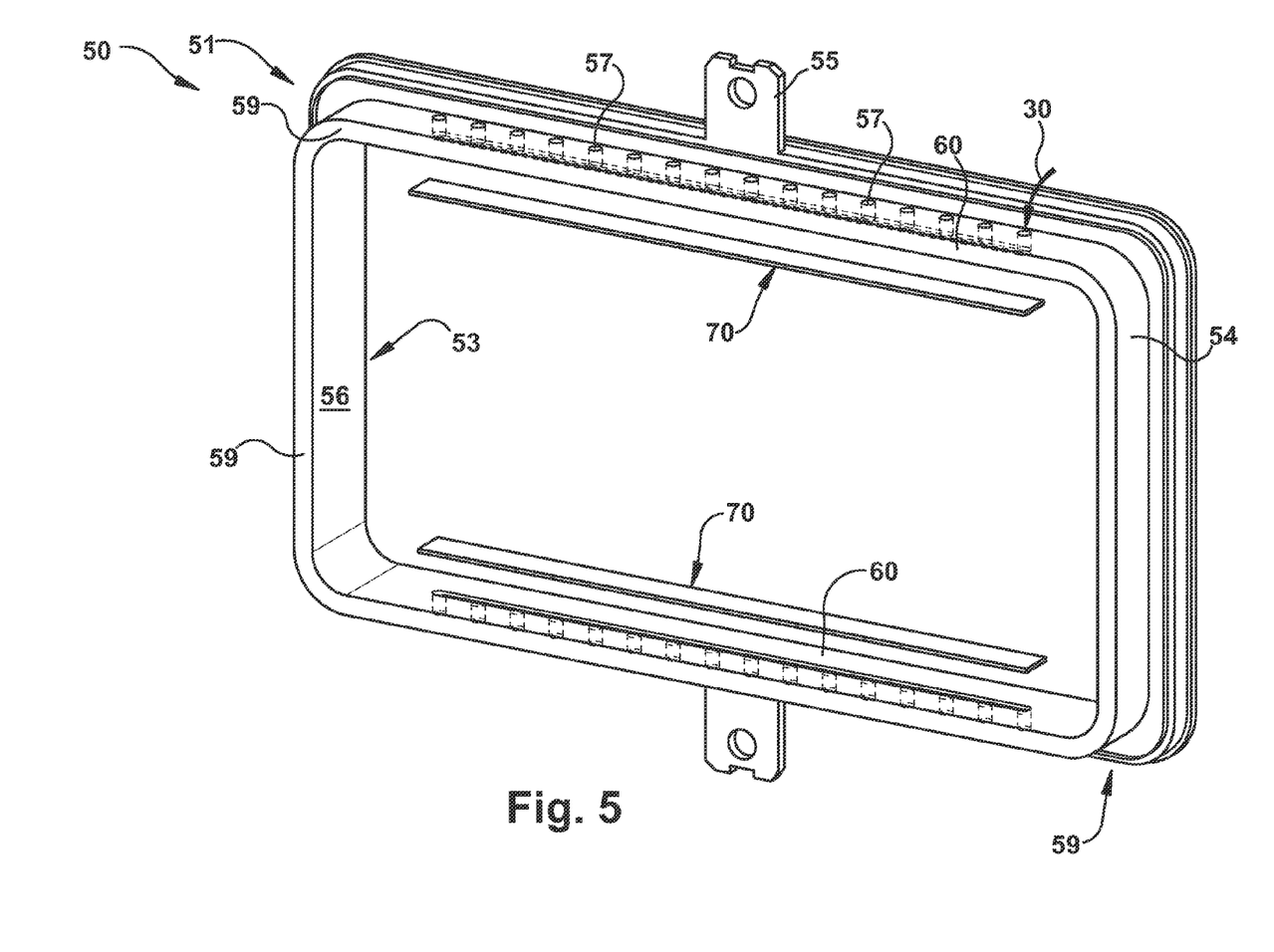
FIG. 5 is an exploded perspective view of another aft frame assembly for a transition piece according to one or more embodiments shown or described herein.
Figure 6:
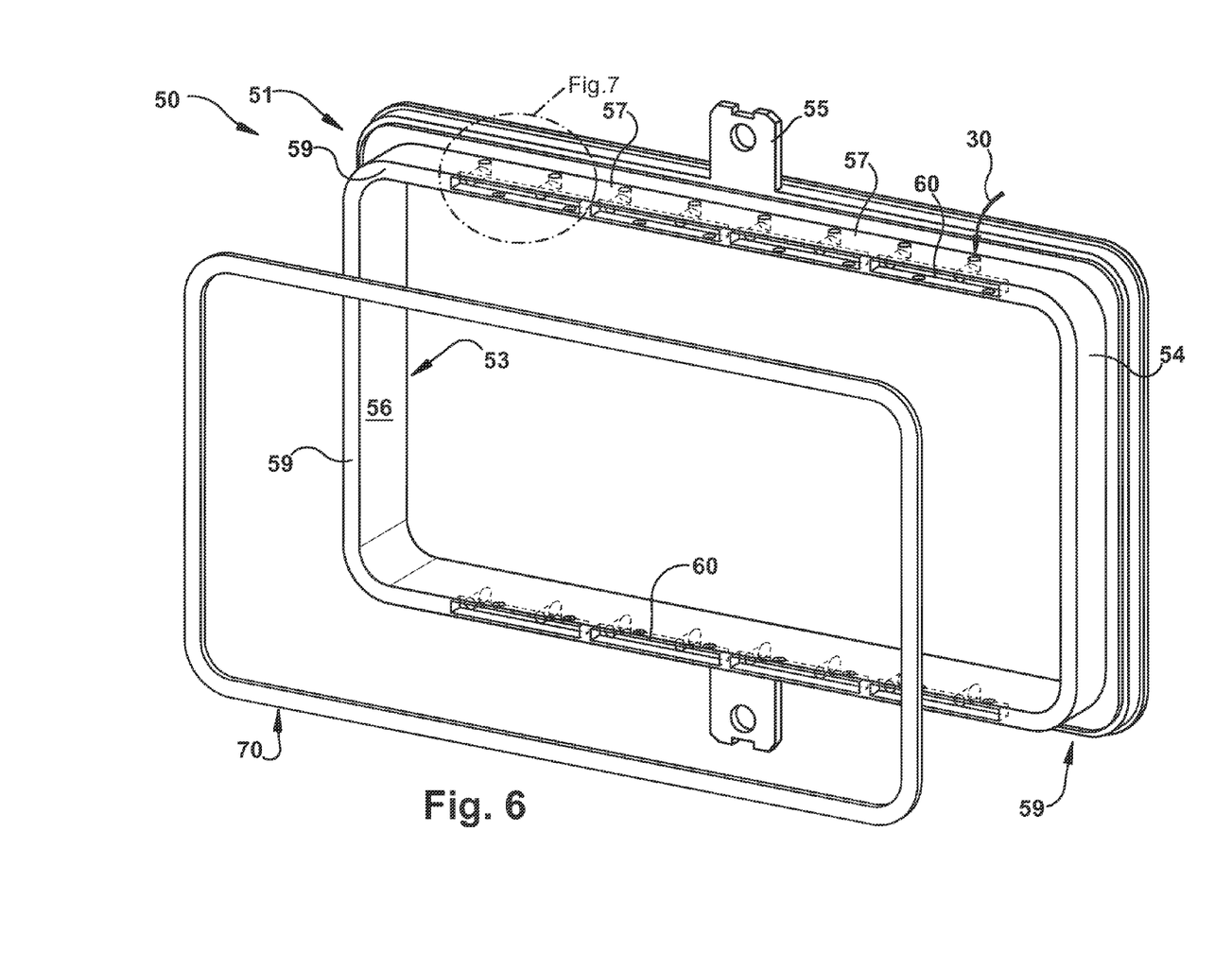
FIG. 6 is an exploded perspective view of yet another aft frame assembly for a transition piece according to one or more embodiments shown or described herein.
Figure 7:
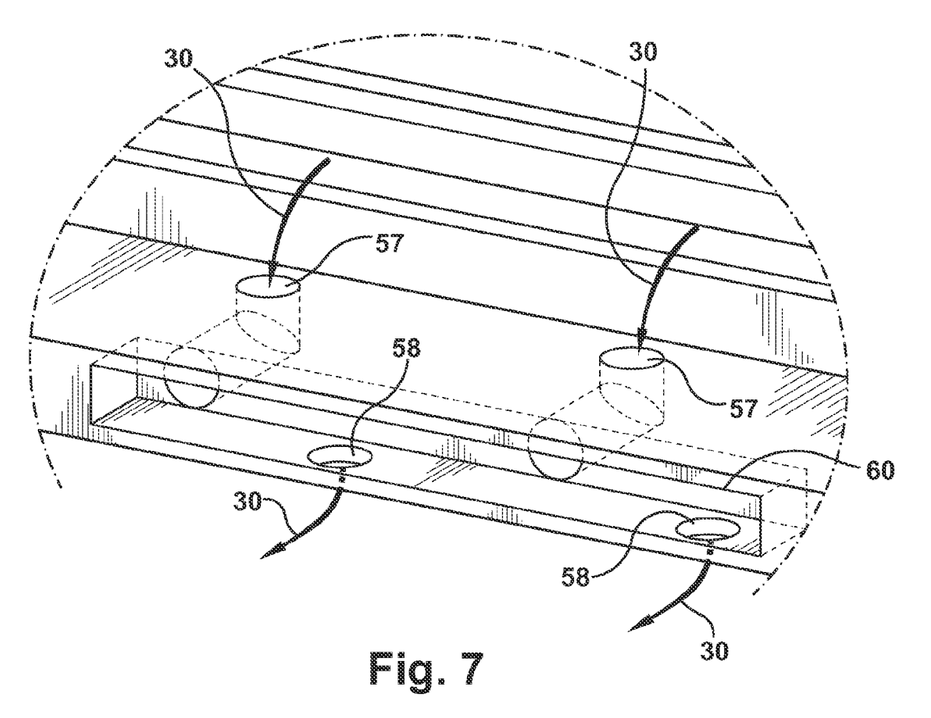
FIG. 7 is an exploded view of a portion of the aft frame assembly of FIG. 6 according to one or more embodiments shown or described herein.
Figure 8:
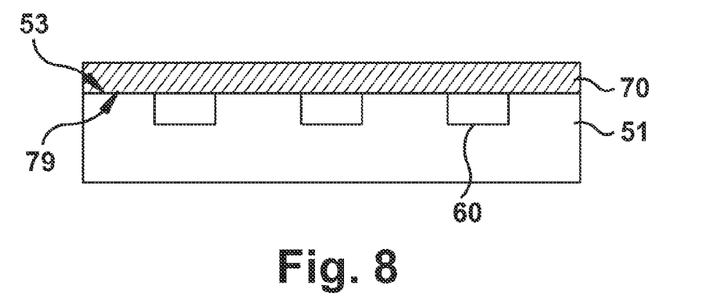
FIG. 8 is a cross sectional view of the body and supplemental component interface of an aft frame assembly according to one or more embodiments shown or described herein.

As best illustrated in FIGS. 2-9, the aft frame assembly 50 further comprises a supplemental component 70. The supplemental component 70 has an inwards facing surface 79 that is bonded to one of the plurality of interior surfaces 53 of the body 51 (e.g., the inner hot face surface 56 or the downstream seal facing surface 59). For example, in some embodiments, such as illustrated in FIGS. 2-5, the supplemental component 70 may comprise a flat plate bonded to the inner hot face surface 56 of the body 51. In such embodiments, one or more cooling channels may ultimately run in an axial direction (FIG. 2), circumferential direction (FIG. 5) or combinations thereof as will become appreciated herein. In other embodiments, such as illustrated in FIGS. 6 and 7, the supplemental component 70 may comprise a continuous ring bonded to the downstream facing seal surface 59 of the body 51 at one or more locations. In other embodiments, a plurality of plates, sections of rings, or other various shaped supplemental components 70 may be bonded to one of the interior surfaces 53.

Referring now to FIGS. 2-9, the aft frame assembly 50 further comprises at least one cooling channel 60 at least partially defined by at least the supplemental component 70 (e.g., its inward facing surface 79) and the interior surface 53 its bonded to (e.g., the inner hot face surface 56 as illustrated in FIGS. 2-5 or the downstream facing seal surface 59 as illustrated in FIGS. 6 and 7). As used herein, "at least partially defined" refers to forming one or more of the walls of the cooling channel 60 such that the flow of compressor discharge air 30 is directed by the surfaces/walls defining the cooling channel 60.

For example, the cooling channel may be manufactured (e.g., carved) into one face (i.e., the inwards facing surface 79 of the supplemental component 70 or one of the interior surfaces of the body 51) such that the other face closes and defines the channel when it is bonded thereto. The at least one cooling channel 60 can thereby fluidly connect at least one of the one or more exterior cooling holes 57 to at least one of the one or more interior cooling outlets 58 for distributing the compressor discharge air 30 there between.

In some embodiments, an open channel (e.g., open trench) may be manufactured (e.g., machined, cut, shaped, or the like) into either the inner hot face surface 56 (as illustrated in FIGS. 2-5) or the downstream facing seal surface 59 (as illustrated in FIGS. 6 and 7) of the body 51. Such an open channel may only be open to the outside environment before the supplemental component 70 is bonded thereto. Specifically, the inwards facing surface 79 of the supplemental component 70 may comprise a flat surface that closes off the open side of said trench such that it forms one or more cooling channels 60.

In an alternative embodiment, the open channel may be manufactured into the inwards facing surface 79 of the supplemental component 70. In such embodiments, the inner hot face surface 56 or the downstream facing seal surface 59 of the body 51 may comprise a substantially flat surface that closes off the open side of said open channel to form the cooling channels 60.

In even some embodiments, both the interior surface 53 of the body 51 (e.g., either the inner hot face surface 56 or the downstream facing seal surface 59) and the inwards facing surface 79 of the supplemental component 70 may each have an open channel manufactured therein such that the opposing open channels at least partially align with one another when the body 51 and the supplemental component 70 are brought together. Such embodiments may provide cooling channels 60 with larger open cross sectional areas without having to remove material as deep into either the body 51 or the supplemental component 70 compared to if the same cooling channel 60 was disposed entirely on one side of the interface.

Using one or all of these embodiments, the aft frame assembly 50 may thereby comprise one or more cooling channels 60 between the body 51 and the supplemental component 70. Specifically, the at least one cooling channel 60 can thereby fluidly connect at least one of the one or more exterior cooling holes 57 to at least one of the one or more interior cooling outlets 58 for distributing the compressor discharge air 30 there between. In some embodiments, a single cooling channel 60 may be formed between the body 51 and the supplemental component 70. For example, if the cooling channel 60 is formed in the downstream facing seal surface 59, the single cooling channel 60 may extend around the entire circumference of the interface, or may extend for only a portion of the circumference.

In other embodiments, a plurality of cooling channels 60 may be formed. For example, a first cooling channel 60 may be utilized to fluidly connect at least a first exterior cooling hole 57 to a least a first interior cooling outlet 58 while a second cooling channel 60 may be utilized to fluidly connect at least a second exterior cooling hole 57 to at least a second interior cooling outlet 58. In some embodiments, the body 51 may possess more interior cooling outlets 58 than exterior cooling holes 57.

In some embodiments, a cooling channel 60 may fluidly connect to more interior cooling outlets 58 than exterior cooling holes 57. For example, a single cooling channel 60 may fluidly connect a single exterior cooling hole 57 to a plurality of interior cooling outlets 58, or two exterior cooling holes 57 to three or more interior cooling outlets 58, or the like. Such embodiments may promote greater distribution of compressor discharge air 30 with less original intake.

The at least one cooling channel 60 of the aft frame assembly 50 may comprise any shape, size and configuration suitable for fluidly connecting the exterior cooling holes 57 and interior cooling outlets 58 as discussed herein. For example, the at least one cooling channel 60 may comprise a serpentine configuration (e.g., travels back and forth as opposed to a direct path) to increase the resident time of the compressor discharge air 30 as it passes through the aft frame assembly to prolong the thermodynamic interaction there between. Such embodiments may promote a longer and/or more distributed cooling period of the aft frame assembly 50 by the compressor discharge air 30. In other embodiments, the at least one cooling channel 60 may be designed to flow compressor discharge air 30 to one or more locations that are particularly subject to increased temperatures during operation of the combustion system 10.

In some particular embodiments, one or more of the cooling channels 60 may be configured to run axially along the transition piece 18 such as in the embodiment illustrated in FIG. 2. In other embodiments, one or more of the cooling channels may be configured to run perpendicular to the axial direction (e.g., the circumferential direction), either on the inner hot face surface 56 (such as illustrated in FIG. 5) or on the downstream facing seal surface 59 (such as illustrated in FIG. 6). In some embodiments, cooling channels may run in a combination or variety of different directions such as based in part on the cooling requirements of the particular transition piece 18.

In these and other embodiments, the interior cooling outlets 59 may thereby be shaped to distribute compressor discharge air 30 in a variety of configurations. For example, the interior cooling outlets 58 may be shaped and positioned to provide a film of compressor discharge air 30 along the interior surface 53. In other embodiments, the interior cooling outlets 58 may be shaped and positioned to direct compressor discharge air 30 towards one or more portions of a first stage nozzle (or other downstream components). In even some embodiments, a plurality of interior cooling outlets 58 may exit into a trench to help facilitate a more uniform exit flow of compressor discharge air 30. Such embodiments may allow for a plurality of interior exit holes 58 to be disposed as a variety of locations while still providing a relatively uniform distribution of compressor discharge air 30.

Moreover, the at least one cooling channel 60 can comprise one or more various cross sectional configurations about its length. For example, the at least one cooling channel 60 may comprise a circular, rectangular, triangular, tear-drop or any other geometrical or non geometrical configuration, or combinations thereof. In some embodiments, the cross sectional area of the at least cooling channel 60 may vary with respect to its length to vary cooling performance about the transition piece 18 as needed.

In some embodiments, such as that illustrated in FIGS. 2-8, the at least one cooling channel 60 may be defined only by the body 51 and the supplemental component 70. However, in some embodiments, such as that illustrated in FIG. 9, the at least one cooling channel 60 may be defined by one or more supplemental intermediate pieces 75 disposed between the body 51 and the supplemental component 70. The one or more supplemental intermediate components 75 may be bonded between the interior surface 53 (e.g., the inner hot face surface 56 or the downstream facing seal surface 59) of the body 51 and the inwards facing surface 79 of the supplemental component 70.

Figure 9:
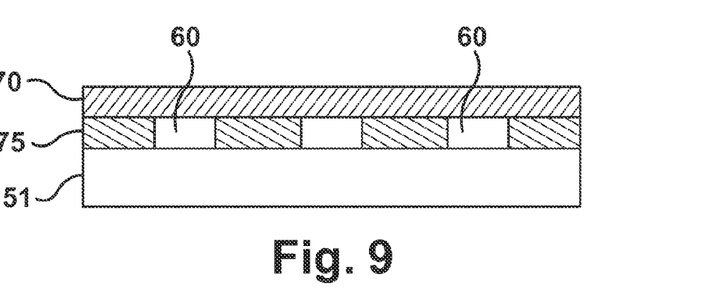
FIG. 9 is another cross sectional view of the body and supplemental component interface of an aft frame assembly according to one or more embodiments shown or described herein; and, FIG. 10 is a method for manufacturing cooling channels in an aft frame assembly according to one or more embodiments shown or described herein.

In such embodiments, open channels, passages or other modifications that lead to the formation of cooling channels may be manufactured into the interior surface 53 of the body 51, the inwards facing surface 79 of the supplemental component 70, and/or any portion of the supplemental intermediate component 75 (such as illustrated in FIG. 9).

The supplemental component 70 (and any supplemental intermediate components 75 when present) may comprise any material suitable for withstanding the operating temperatures of the combustion system 10 while still being appropriate for bonding to the body 51 of the aft frame assembly 50. For example, in some embodiments, the supplemental component 70 and/or supplemental intermediate component(s) may comprise the same material as the body 51 of the aft frame assembly 50. In some embodiments, such as when diffusion bonding and/or brazing are to be used, the supplemental component 70 (and any supplemental intermediate components 75) may comprise be IN625, IN617, H230, H282, GTD222, FSX414, MarM509, X40/45, L605/Haynes 25, Haynes 188 or the like. In some embodiments, such as when the open portion of the channel is more narrow, the supplemental component 70 may comprise a coating (e.g., bondcoat or thermal barrier coating) deposited on the surface that forms a closed surface.

In some embodiments, the supplemental component 70 and/or supplemental component(s) 75 may comprise a pre-sintered preform. The pre-sintered preform comprises a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform to about 10 volume percent or less. In some embodiments, the density of the pre-sintered preform has a density of 90% or better. In even some embodiments, the pre-sintered preform has a density of 95% or better.

The base alloy of the pre-sintered preform can comprise any composition such as one similar to the body 51 of the aft frame assembly 50 to promote common physical properties between the supplemental component 70 and/or supplemental component(s) 75 and the body 51. For example, in some embodiments, the base alloy (of the pre-sintered preform) and the body 51 of the aft frame assembly 50 share a common composition (i.e., they are the same type of material). In some embodiments, the base alloy can comprise nickel-based superalloys such as René N4, René N5, René 108, René 142, René 195, GTD-111®, GTD-222®, GTD-444®, IN-738, Haynes 230, Haynes 282, and MarM 247 or cobalt-based superalloys such as FSX-414, X40/45, MarM509, CoCrMo, L605/Haynes 25, and Haynes 188 as discussed above. In some embodiments, the properties for the base alloy include chemical and metallurgical compatibility with the body 51 of the aft frame assembly 50, such as high fatigue strength, low tendency for cracking, oxidation resistance and/or machinability.

In some embodiments, the base alloy may comprise a melting point of within about 25° C. of the melting temperature of the body 51 of the aft frame assembly 50. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance being nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities. It should be appreciated that while specific materials and compositions have been listed herein for the composition of the base alloy of the pre-sintered preform the supplemental component 70 and/or supplemental component(s) 75, these listed materials and compositions are exemplary only and non-limiting and other alloys may alternatively or additionally be used. Furthermore, it should be appreciated that the particular composition of the base alloy for the pre-sintered preform may depend on the composition of the body 51 of the aft frame assembly 50.

As discussed above, the pre-sintered preform further comprises a second alloy. The second alloy may also have a composition similar to the body 51 of the aft frame assembly 50 but further contain a melting point depressant to promote sintering of the base alloy and the second alloy particles and enable bonding of the pre-sintered preform supplemental component 70 and/or supplemental component(s) 75 to the body 51 of the aft frame assembly 50 at temperatures below the melting point of the body 51. For example, in some embodiments the melting point depressant can comprise boron and/or silicon.

In some embodiments, the second alloy may comprise a melting point of about 25° C. to about 50° C. below the grain growth or incipient melting temperature of the body 51 of the aft frame assembly 50. Such embodiments may better preserve the desired microstructure of the body 51 during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy. In some embodiments, such as when the base alloy comprises a Nickel based alloy, the second alloy may comprise DF4B, AMS4782, or D15Mod2. In some embodiments, such as when the base alloy comprises a Cobalt based alloy, the second alloy may comprise MarM509B or AMS4783. It should also be appreciated that while specific materials and compositions have been listed herein for the composition of the second alloy of the pre-sintered preform supplemental component 70 and/or supplemental component(s) 75, these listed materials and compositions are exemplary only and non-limiting and other alloys may alternatively or additionally be used. Furthermore, it should be appreciated that the particular composition of the second alloy for the pre-sintered preform supplemental component 70 and/or supplemental component(s) 75 may depend on the composition of the body 51 of the aft frame assembly 50.

The pre-sintered preform can comprise any relative amounts of the base alloy and the second alloy that are sufficient to provide enough melting point depressant to ensure wetting and bonding (e.g., diffusion/brazing bonding) of the particles of the base alloy and the second alloy to each other and to the interior surface 53 (e.g., the inner hot face surface 56 or the downstream facing seal surface 59) of the body 51 of the aft frame assembly 50. For example, in some embodiments the second alloy can comprise at least about 10 weight percent of the pre-sintered preform. In some embodiments the second alloy can comprise no more than 70 weight percent of the pre-sintered preform. Such embodiments may provide a sufficient amount of melting point depressant while limiting potential reduction of the mechanical and environmental properties of the subsequent heating. Furthermore, in these embodiments, the base alloy can comprise the remainder of the pre-sintered preform (e.g., between about 30 weight percent and about 70 weight percent of the pre-sintered preform). In even some embodiments, the particles of the base alloy can comprise about 40 weight percent to about 70 weight percent of the pre-sintered preform with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Aside from the particles of the base alloy and the second alloy, no other constituents are required within the pre-sintered preform. However, in some embodiments, a binder may be initially blended with the particles of the base alloy and the second alloy to form a cohesive mass that can be more readily shaped prior to sintering. In such embodiments, the binder can include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which may volatilize cleanly during sintering.

The pre-sintered preform may be formed by mixing the powder particles of the base alloy (i.e., base alloy particles) and the second alloy (i.e., second alloy particles) by any suitable means such as stirring, shaking, rotating, folding or the like or combinations thereof. After mixing, the mixture may be combined with the binder (i.e., to form a combined powder mixture) and cast into shapes (i.e., to form a compacted preform), during and/or after which the binder can be burned off. The compacted preform may then be placed in a non-oxidizing (vacuum or inert gas) atmosphere furnace for the sintering operation, during which the powder particles of the base alloy and the second alloy undergo sintering to yield the pre-sintered preform with good structural strength and low porosity. Suitable sintering temperatures may at least in part depend on the particular compositions of the particles of the base alloy and the second alloy. For example, in some embodiments, the sintering temperature may be in a range of about 1010° C. to about 1280° C. In some embodiments, following sintering, the pre-sintered preform can be HIPed or vacuum pressed to achieve densities greater than 95%.

In such pre-sintered preform embodiments, heating for bonding the components may occur within a non-oxidizing (vacuum or inert gas) atmosphere, to a temperature capable of melting the particles comprising the second alloy (i.e., the lower melting particles) of the pre-sintered preform, such as within a range of about 2050° F. to about 2336° F. (about 1120° C. to about 1280° C.) (depending on composition) for a period of about 10 to about 60 minutes. The second alloy particles can then melt and wet the particles of the base alloy and the exterior surface 52 of the body 51 of the aft frame assembly 50 thereby creating a two-phase mixture that alloys together. Additionally, by using the combination of the base alloy and the second alloy, the pre-sintered preform may not significantly close the plurality of exterior cooling holes 57 or interior cooling outlets 58 or the cooling channels 60 between the body 51 and the supplemental component 70.

It should also be appreciated that any type of heating may be utilized such as, but not limited to, furnace, induction heating, torches, ovens or any other source to sufficiently bond the materials. In even some embodiments, the heating may be achieved through friction welding such that the heating process is more localized to the surface regions.

In some embodiments, a small amount of additional low melt constituent (e.g., a braze foil) material can be placed between the supplemental component 70 and the body 51 of the aft frame assembly 50 to increase brazement quality. Thereafter, the body 51 and the supplemental component 70 can be cooled below the solidus temperature of supplemental component 70 to solidify the mixture and form the superalloy brazement. The brazement can then undergo a heat treatment at a temperature of about 1975° F. to about 2100° F. (about 1080° C. to about 1150° C.) the one or more alloys of the supplemental component 70 with each other and/or the body 51 of the aft frame assembly 50. After heat treatment, any excess material in the brazement can be removed by grinding or any other suitable method.

In some embodiments, a filler material (not illustrated) may temporarily be disposed in the cooling channels 60 (and/or cooling holes 57 and 58 if necessary) prior to bonding the supplemental component 70 to the body 51 to ensure said open features do not clog. Such filler material may be disposed through any suitable means and comprise any suitable material for temporarily stopping-off the passages. For example, the filler material may comprise a material that does not melt when the supplemental component 70 is bonded to the body 51, but that can subsequently be removed via additional heating at a higher temperature, the application of select chemicals or any other suitable method. Such embodiments may be particularly suitable for smaller passages such as those with a diameter of 0.03 inches (0.762 millimeters) or less.

In other embodiments, the supplemental component 70 and/or supplemental intermediate component(s) 75 may be bonded to the interior surface 53 (e.g., the inner hot face surface 56 or the downstream facing seal surface 59) of the body 51 of the aft frame assembly 50 via diffusion bonding. Such bonding may occur at any suitable pressure and temperature for the given material(s) of the body 51, the supplemental component 70 and/or the supplemental intermediate component(s) 75.

Figure 10:
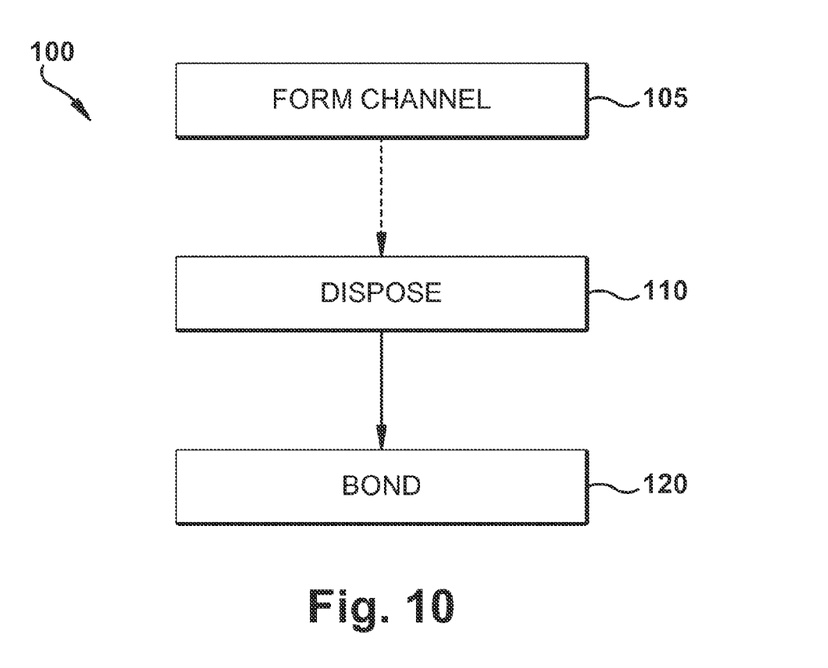

Referring additionally now to FIG. 10, a method 100 is illustrated for manufacturing at least one cooling channel 60 in an aft frame assembly 50 for a gas turbine transition piece 18.

The method 100 first comprises, in step 110, disposing a supplemental component 70 against at least one of a plurality of interior surfaces 53 (e.g., inner hot face surface 56 or downstream facing seal surface 59) of the body 51 of the transition piece 18, wherein the at least one cooling channel 60 is at least partially defined by the supplemental component 70 and the interior surface 53 that the supplemental component 70 is bonded to.

The method further comprises, in step 120, bonding the supplemental component 70 to the transition piece 18, wherein the at least one cooling channel fluidly connects one or more exterior cooling holes 57 on the exterior surface 52 of the body 51 to one or more interior cooling outlets 58. As discussed above, the one or more exterior cooling holes 57 can capture compressor discharge air 30 that then passes through the at least one cooling channel 60 and is subsequently discharged by the one or more interior cooling outlets 58.

In some embodiments, the method 100 may first optionally comprise, in step 105, forming an open channel in at least one of the supplemental component 70 (i.e., in its inwards facing surface 79) and the interior surface 53 its bonded to (e.g., the inner hot face surface 53 or the downstream facing seal surface 59). Said open channel will subsequently be closed off by the adjacent supplemental component 70 or body 51 to form the at least one cooling channel 60. The open channel may be formed using any suitable technique discussed above (e.g., machined, cut, shaped, or the like). In other embodiments, the body 51 and/or the supplemental component 70 may already be provided with the open channel formed therein.

It should now be appreciated that cooling channels may be formed in aft frame assemblies for gas turbine transition pieces by bonding a supplemental component to the exterior surface of the aft frame assembly's body with the cooling channels being disposed there between. Forming the cooling channels between the surfaces of the body and the supplemental component may facilitate a more accessible manufacturing process and/or reduce or eliminate the need for shallow angle cooling holes being drilled into the aft end of the aft frame assembly. Aft frame assemblies disclosed herein may thereby be cooled using cooling channels designed to mitigate the components thermal profile during operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aft frame assembly for a gas turbine transition piece for enclosing and confining combustion products for flow from a combustor to a first stage nozzle, the aft frame assembly comprising:
   a body comprising an exterior surface and a plurality of interior surfaces;
   one or more exterior cooling holes disposed on the exterior surface of the body for capturing compressor discharge air outside of the transition piece;
   a supplemental component bonded to at least one of the plurality of interior surfaces of the body;
   at least one cooling channel at least partially defined by the supplemental component and the interior surface that the supplemental component is bonded to,
   wherein the at least one cooling channel fluidly connects at least one of the one or more exterior cooling holes to one or more interior cooling outlets that discharge the compressor discharge air captured from the at least one of the one or more exterior cooling holes; wherein the supplemental component comprises a pre-sintered preform that does not clog the one or more exterior cooling holes or the one or more interior cooling outlets or the at least one cooling channel between the body and the supplemental component; wherein the at least one cooling channel runs in a circumferential direction.

2. The aft frame assembly of claim 1, wherein the at least one cooling channel is at least partially manufactured into the interior surface comprising an inner hot face surface of the body.

3. The aft frame assembly of claim 1, wherein the at least one cooling channel is at least partially manufactured into the interior surface comprising a downstream facing seal surface of the body.

4. The aft frame assembly of claim 1, wherein the pre-sintered preform comprises a mixture comprising a base alloy and a second alloy, the base alloy comprising about 30 weight percent to about 90 weight percent of the mixture and the second alloy comprising a sufficient amount of a melting point depressant to have a lower melting temperature than the base alloy.

5. The aft frame assembly of claim 1, wherein the supplemental component comprises a coating.

6. The aft frame assembly of claim 1, further comprising a supplemental intermediate component disposed between the body and the supplemental component.

7. The aft frame assembly of claim 6, wherein the at least one cooling channel is at least partially manufactured into the supplemental intermediate component.

8. The aft frame assembly of claim 1, wherein the body comprises more interior cooling outlets than exterior cooling holes.

9. The aft frame assembly of claim 1, wherein the at least one cooling channel fluidly connects to more interior cooling outlets than exterior cooling holes.

10. The aft frame assembly of claim 1, wherein the at least one cooling channel is at least partially manufactured into the supplemental component and the interior surface of the body that the supplemental component is bonded to comprises a flat surface.

11. A method for manufacturing at least one cooling channel in an aft frame assembly for a gas turbine transition piece for enclosing and confining combustion products for flow from a combustor to a first stage nozzle, the method comprising:
   disposing a supplemental component against at least one of a plurality of interior surfaces of a body of the gas turbine-transition piece, wherein the at least one cooling channel is at least partially defined by the supplemental component and the interior surface that the supplemental component is bonded to;
   bonding the supplemental component to the transition piece, wherein the at least one cooling channel fluidly connects one or more exterior cooling holes on an exterior surface of the body to one or more interior cooling outlets; wherein the supplemental component comprises a pre-sintered preform that does not clog the one or more exterior cooling holes or the one or more interior cooling outlets or the at least one cooling channel between the body and the supplemental component; wherein the at least one cooling channel runs in a circumferential direction.

12. The method of claim 11, further comprising forming an open channel in the interior surface of the body comprising an inner hot face surface of the body prior to disposing them against each other.

13. The method of claim 11, further comprising forming an open channel in the interior surface of the body comprising a downstream facing seal of the body prior to disposing them against each other.

14. The method of claim 11, wherein the pre-sintered preform comprises a mixture comprising a base alloy and a second alloy, the base alloy comprising about 30 weight percent to about 90 weight percent of the mixture and the second alloy comprising a sufficient amount of a melting point depressant to have a lower melting temperature than the base alloy.

15. The method of claim 11, wherein the supplemental component comprises a coating.

16. The method of claim 11, further comprising disposing a supplemental intermediate component disposed between the body and the supplemental component prior to bonding.

17. The method of claim 16, wherein the at least one cooling channel is at least partially manufactured into the supplemental intermediate component.

18. The method of claim 11, wherein the body comprises more interior cooling outlets than exterior cooling holes.

19. The method of claim 11, wherein the at least one cooling channel fluidly connects to more interior cooling outlets than exterior cooling holes.

20. The method of claim 11, wherein the at least one cooling channel is at least partially manufactured into the supplemental component and the interior surface of the body that the supplemental component is bonded to comprises a flat surface.

* * * * *